United States Patent [19]

Harris et al.

[11] 4,299,081
[45] Nov. 10, 1981

[54] GRAPE HARVESTER

[75] Inventors: Robert H. Harris, Indianapolis; Troy G. Humphrey, Beech Grove; John J. Stimson, Jr., Indianapolis, all of Ind.

[73] Assignee: Labeco Harvesters, Inc., Clovis, Calif.

[21] Appl. No.: 120,542

[22] Filed: Feb. 11, 1980

[51] Int. Cl.³ .................... A01D 46/26; A01D 46/28
[52] U.S. Cl. .................................. 56/330; 56/328 TS
[58] Field of Search ........................... 56/328 TS, 330

[56] References Cited

U.S. PATENT DOCUMENTS

| | | | |
|---|---|---|---|
| 3,187,493 | 6/1965 | Harrett | 56/330 |
| 3,245,211 | 4/1966 | Weygandt et al. | 56/330 |
| 3,548,578 | 12/1970 | Shipley, Jr. | 56/328 TS |
| 3,636,688 | 1/1972 | Fontan | 56/330 |
| 3,771,768 | 11/1973 | Gebendinger | 56/328 TS |
| 4,172,352 | 10/1979 | McCarthy et al. | 56/330 |
| 4,198,801 | 4/1980 | Claxton | 56/330 |
| 4,207,727 | 6/1980 | Poytress | 56/330 |

Primary Examiner—Paul J. Hirsch
Attorney, Agent, or Firm—Woodard, Weikart, Emhardt & Naughton

[57] ABSTRACT

A harvester for shaking a grape vine to remove grapes therefrom. A harvesting vehicle includes a pivotally mounted picking head suspended over in straddling fashion a row of grape vines. A pair of swingably mounted and oppositely aligned contact members are reciprocated in unison back and forth against opposite sides of the grape vine. The contact members are driven by a pair of cranks in turn rotated via a belt and motor combination. A pair of counterweight shafts rotatably mounted within the head have off-centered counterweights with each shaft being rotated in unison with but in an opposite direction by its associated crankshaft in turn driving the crank arm and contact member. Horizontal force from the rotating counterweights are additive to forces from additional counterweights associated with the rotating crank arms to neutralize oppositely directed forces from the reciprocating contact members.

2 Claims, 8 Drawing Figures

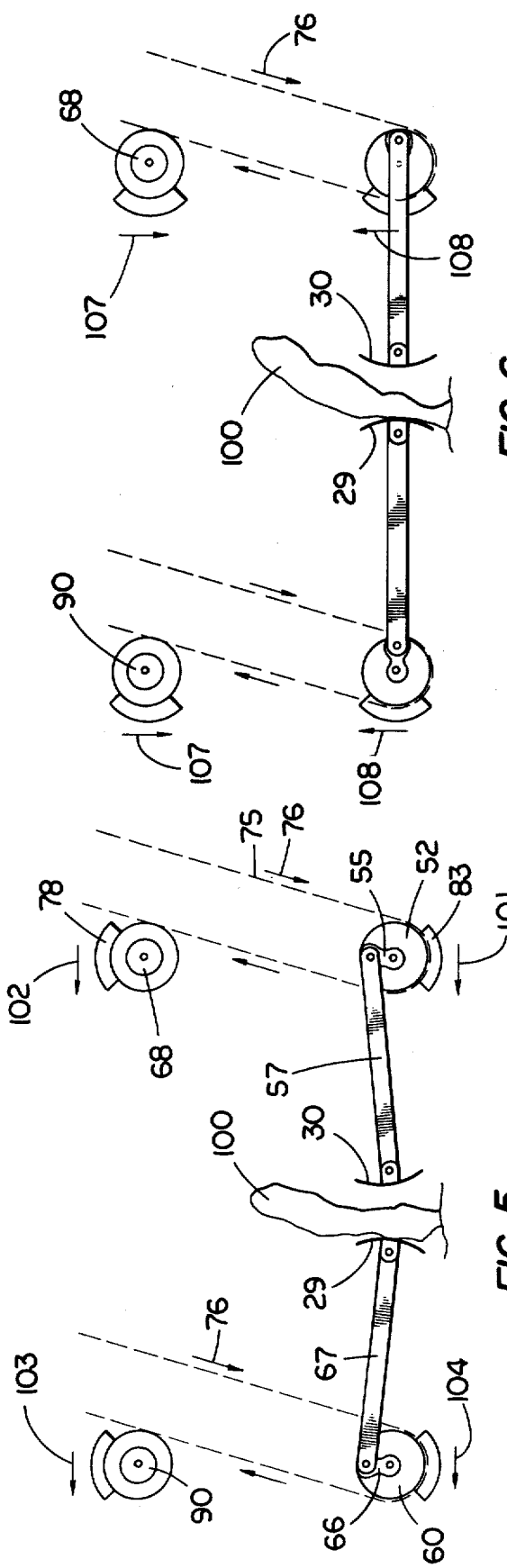
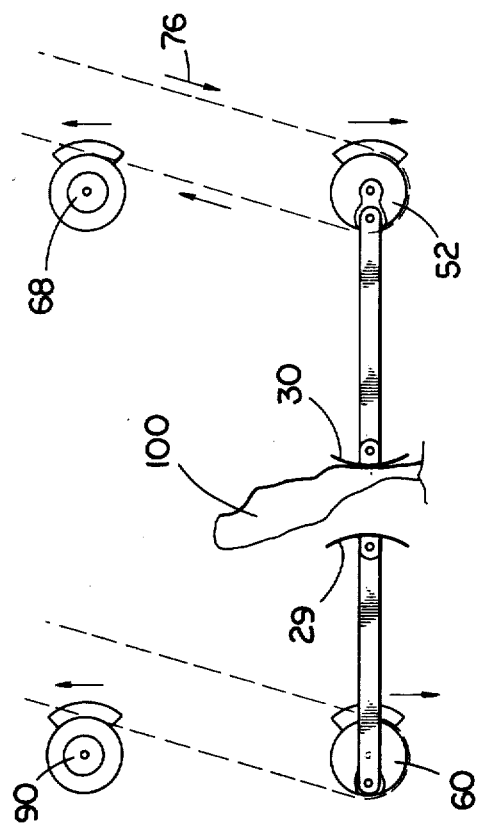
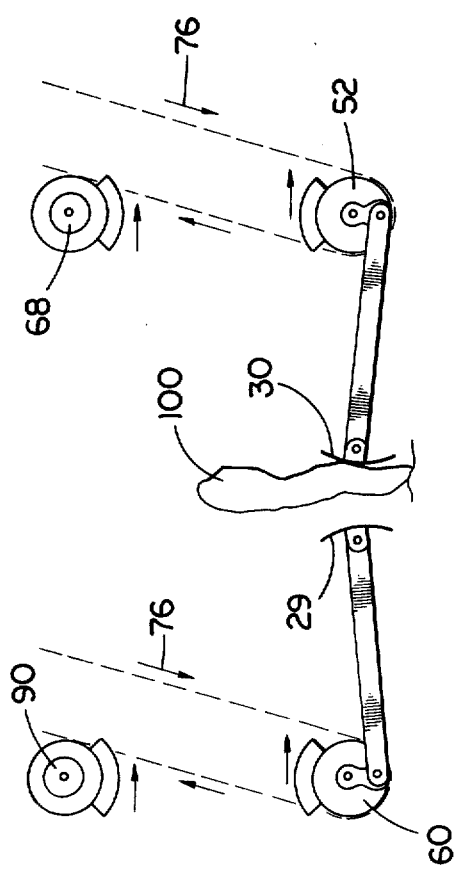
FIG. 5 FIG. 6 FIG. 7 FIG. 8

GRAPE HARVESTER

BACKGROUND OF THE INVENTION

This invention is in the field of devices used to pick fruit or other edible items from a variety of plants, including vines such as grape vines. Typically, the plants to be harvested are arranged in a row with the harvester then proceeding along the length of the row removing the edible items therefrom. Grape harvesters have heretofore been provided which are designed to straddle a row of grape vines with the harvester having a pair of spaced apart arms elevated above ground and driven in a generally back-and-forth horizontal movement to pulsate or strike opposite sides of the grape vine causing the grapes to fall from the vine into a receptacle on the harvester. Typically, the pulsating arms are driven in unison first in a general horizontal direction and then in an opposite direction. The arms are movably mounted to a picking head in turn movably mounted to the harvester to track the row of grape vines.

It is the practice to reciprocate the pulsating arms at a speed of approximately 400 to 500 cycles per minute. The pulsating arms are relatively heavy in order to impart sufficient force to the grape vines. For example, each pulsating arm may weigh approximately 80 pounds. As a result of the rapid back-and-forth movement and heavy weight of the pulsating arms, a considerable amount of vibration occurs in the picking head reducing the life of the head and in fact resulting in the eventual self-destruction of the picking head.

Disclosed herein is a balanced picking head which circumvents the aforementioned vibration problem resulting in a greatly increased life of the picking head while minimizing maintenance thereof. A pair of off-centered weights are rotated in a direction opposite of the crankshafts which drive the pulsating arms providing a force neutralizing the vibration normally resulting from the back-and-forth movement of the pulsating arms.

SUMMARY OF THE INVENTION

One embodiment of the present invention is a head for picking items growing in a row of plants comprising a frame, a first plant contactor movably mounted on the frame, a second plant contactor movably mounted on the frame and spaced from the first plant contactor forming a plant passage, drive means mounted on the frame and engaged with the first plant contactor and second plant contactor operable to cyclically move the first plant contactor and second plant contactor in unison in a first direction and then in a second opposite direction against plants in the passage shaking items therefrom, vibration dampening means mounted on the frame and including a plurality of weights movably mounted to the frame and operably associated with the first plant contactor and second plant contactor being operable to move oppositely of the first plant contactor and second plant contactor dampening vibrations from movement of each contactor.

Another embodiment of the present invention is a device to pulsatingly strike a plant comprising a first rotatably driven shaft, a first crank arm with a proximal end bearingly connected off-center to the shaft and a distal end to pulsatingly strike a plant, a first weight mounted on the shaft and angularly positioned opposite of the proximal end, a first counterbalance shaft, first means to rotate the counterbalance shaft in unison but in opposite direction of the driven shaft, a counterweight on the counterbalance shaft and positioned thereon at top center when the proximal end is at top center on the driven shaft.

Yet another embodiment of the present invention is a harvester comprising frame means operable to move along a row of plants having growing items thereon to be removed, head means movably mounted on the frame means and positionable on opposite sides of the row being movable with the frame means along the row, the head means including a pair of contact members reciprocably mounted on the frame means to move in unison back and forth against a plant positioned therebetween, drive means engaged with the members and operable to reciprocate same, counterweight means movably mounted on the frame, and timing means operable associated with the contact members and the counterweight means and operable to move the counterweight means in response to movement of the contact members but limiting movement of the counterweight means to a direction generally opposite to the direction of movement of the members.

In addition, an embodiment of the present invention is a grape harvester comprising a vehicle movable along in straddling fashion a row of grape vines and including a receptacle to catch falling grapes, a head mounted on the vehicle to pulsate the grape vines to cause grapes to fall therefrom into the receptacle, the head including a frame having a pair of downwardly extending spaced apart supports forming a channel through which the row of grape vines may pass, a pair of horizontally movable arms mounted to the supports with spaced apart distal ends positionable on opposite sides of the row of grape vines, driving means mounted on the frame and operatively associated with the arms to reciprocate the arms back and forth against the grape vines while limiting movement of one arm to approximately the same horizontal direction of movement as the other arm, and counterweight means including a first off-centered counterweight rotatably mounted on the frame, the counterweight means being operable to provide a vibration-neutralizing force in a direction opposite of the direction of movement of the arms.

It is an object of the present invention to provide a new and improved grape harvester.

Another object of the present invention is to provide a device for picking items growing on a row of plants which has a minimum of vibration resulting from the picking process.

A further object of the present invention is to provide a harvester having a picking head with a relatively long life.

Related objects and advantages of the present invention will be apparent from the following description.

BRIEF DESCRIPTION OF THE DRAWINGS

FIG. 5 is a diagrammatic view of the pulsating arms with associated crankshafts and counterweight shafts with the pulsating arms moving toward the right-hand position.

FIG. 6 is the same view as FIG. 5 only showing the pulsating arms in the extreme right position.

FIG. 7 is the same view as FIG. 6 only showing the pulsating arms moving toward the extreme left position.

FIG. 8 is the same view as FIG. 7 only showing the pulsating arms located in the extreme left position.

DESCRIPTION OF THE PREFERRED EMBODIMENT

Figure 1:
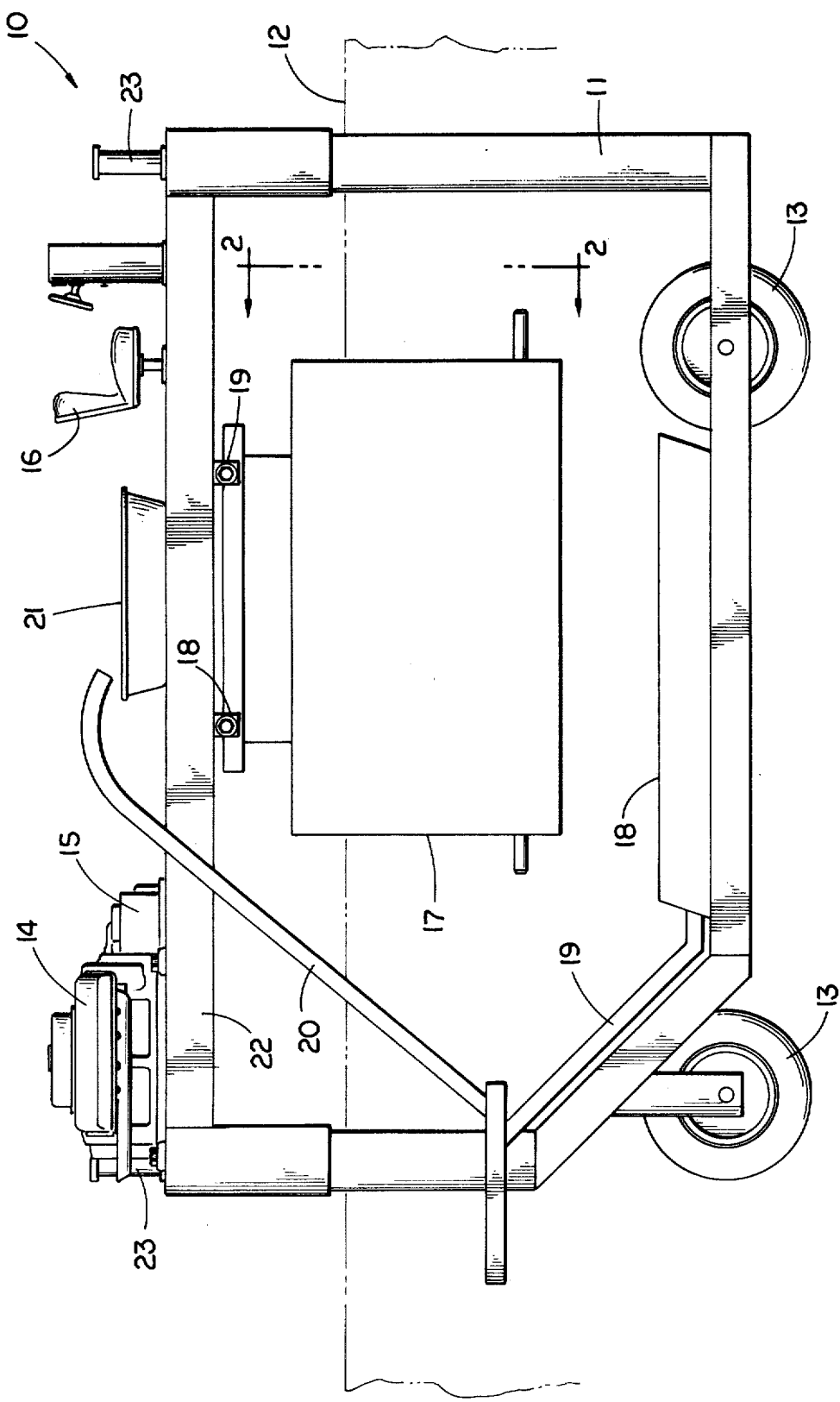
FIG. 1 is a fragmentary side view of a harvester incorporating the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a harvester for picking grapes or other edible items. Harvester 10 has a conventional frame 11 which is movable along a row of grape vines, illustrated by dashed line 12 with the harvester straddling the single row of grape vines and movable the length thereof along a plurality of rotatably driven wheels 13. A conventional diesel engine or other suitable source of energy 14 is mounted to frame 11 and is operable to power a hydraulic system 15 in turn operably and drivingly engaged with wheels 13 for propelling the vehicle along the row of plants to be harvested. A conventional seat 16 for accommodating the operator is provided atop the frame with conventional controls for operating the vehicle and picking head to be described.

Picking head 17 is pivotally mounted by joints 18 and 19 to the top portion 22 of frame 11 and is operable to shake the plants or grape vine in such a manner so as to cause the edible items or grapes to fall downwardly into collector conveyors 18 in turn routed through a system of conveyors 19 and 20 to a storage receptable 21 all mounted to frame 11. The collector conveyors are conventional in construction. The top portion 22 of frame 11 may be adjusted downwardly toward the ground by hydraulic lifts 23 thereby controlling the height of picking head 17 relative to the grape vine. Such a vertically adjustable frame with hydraulic lifts are commercially available and will not be detailed herein.

Figure 2:
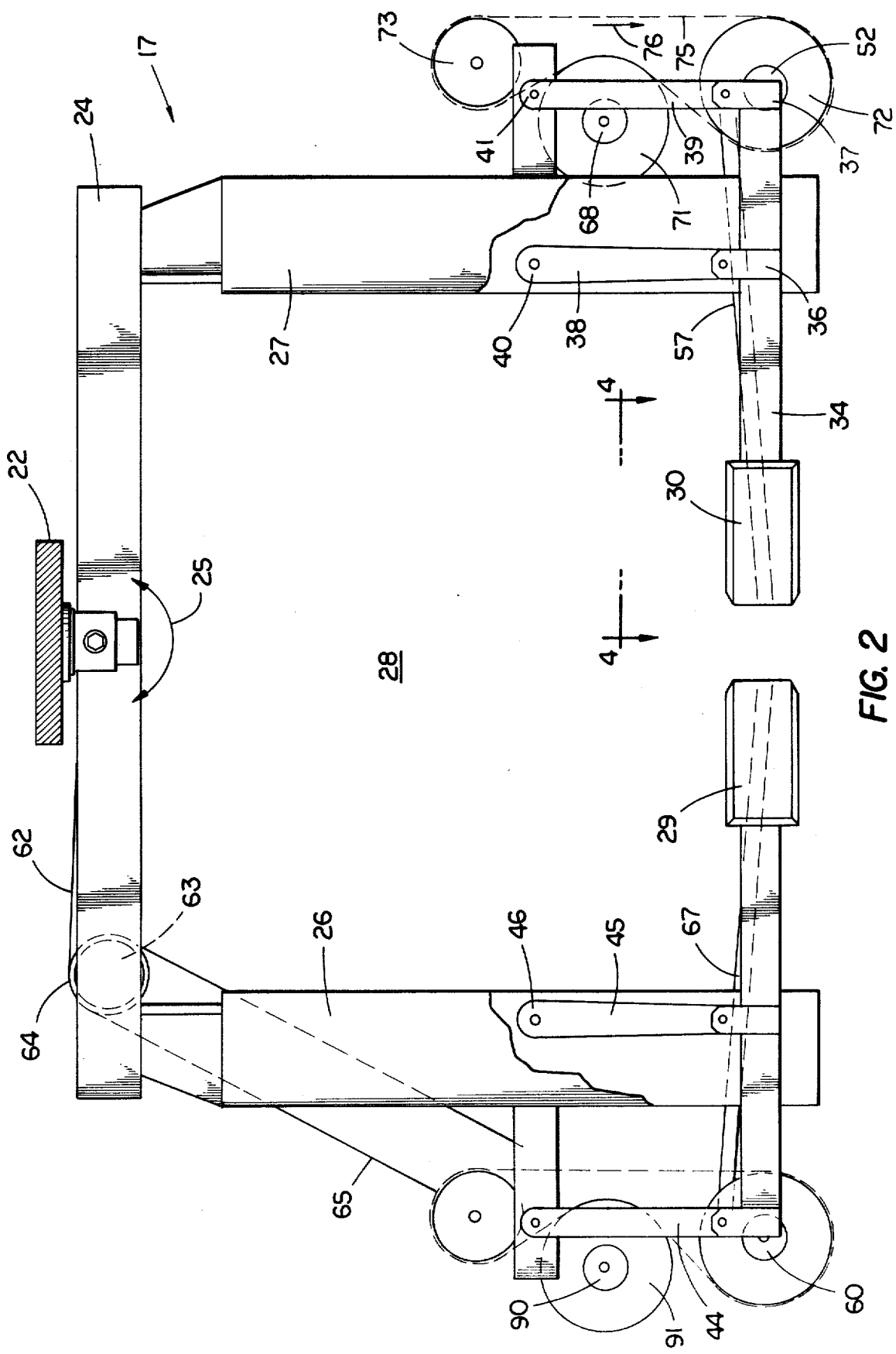
FIG. 2 is an fragmentary enlarged cross-sectional view taken along line 2—2 of FIG. 1 being viewed in the direction of the arrows and showing the picking head.
Figure 3:
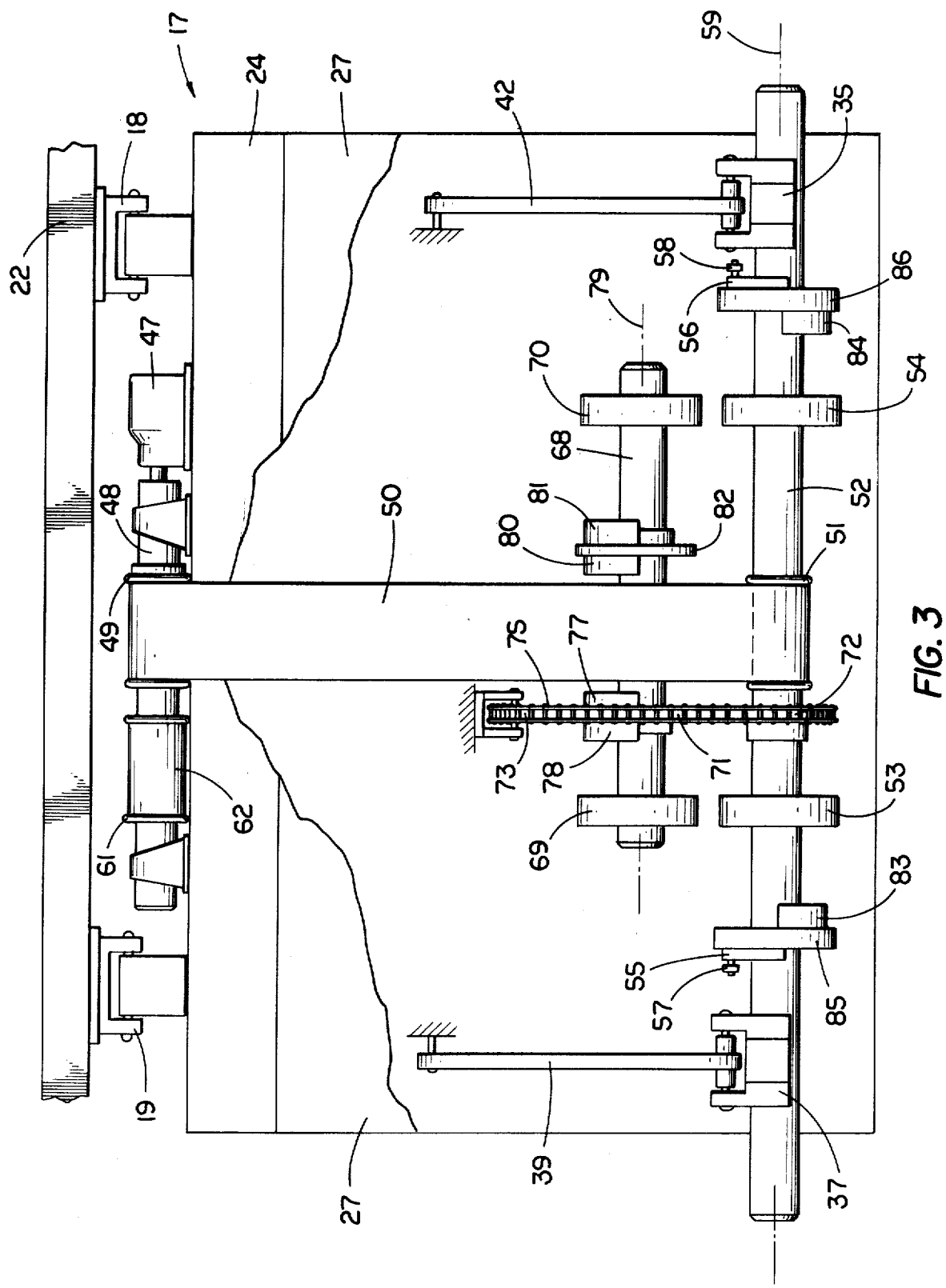
FIG. 3 is a fragmentary right-hand side view of the head shown in FIG. 2.

Referring now to FIGS. 2 and 3, there is shown the picking head 17 which is operable to shake the plant or grape vine being harvested. Head 17 includes a main frame 24 which is pivotally mounted via joints 18 and 19 to the top portion 22 of main frame 11. As shown in FIG. 3, joints 18 and 19 include a pair of downwardly extending ears from frame portion 22 which bearingly receive a connecting pin extending through upwardly extending ears from frame 24. Thus, head 17 is pivotable at least to a limited extent in the direction of arrows 25 (FIG. 2). Frame 24 includes a pair of downwardly extending supports 26 and 27 which are spaced apart forming a passage 28 through which the row of plants may pass as the vehicle and head are driven the length of the row. A pair of horizontally movable arms or contact members 29 and 30 are swingably mounted respectively at the bottom ends of supports 26 and 27 and are reciprocated in unison back and forth in a generally horizontal shallow arc.

Figure 4:
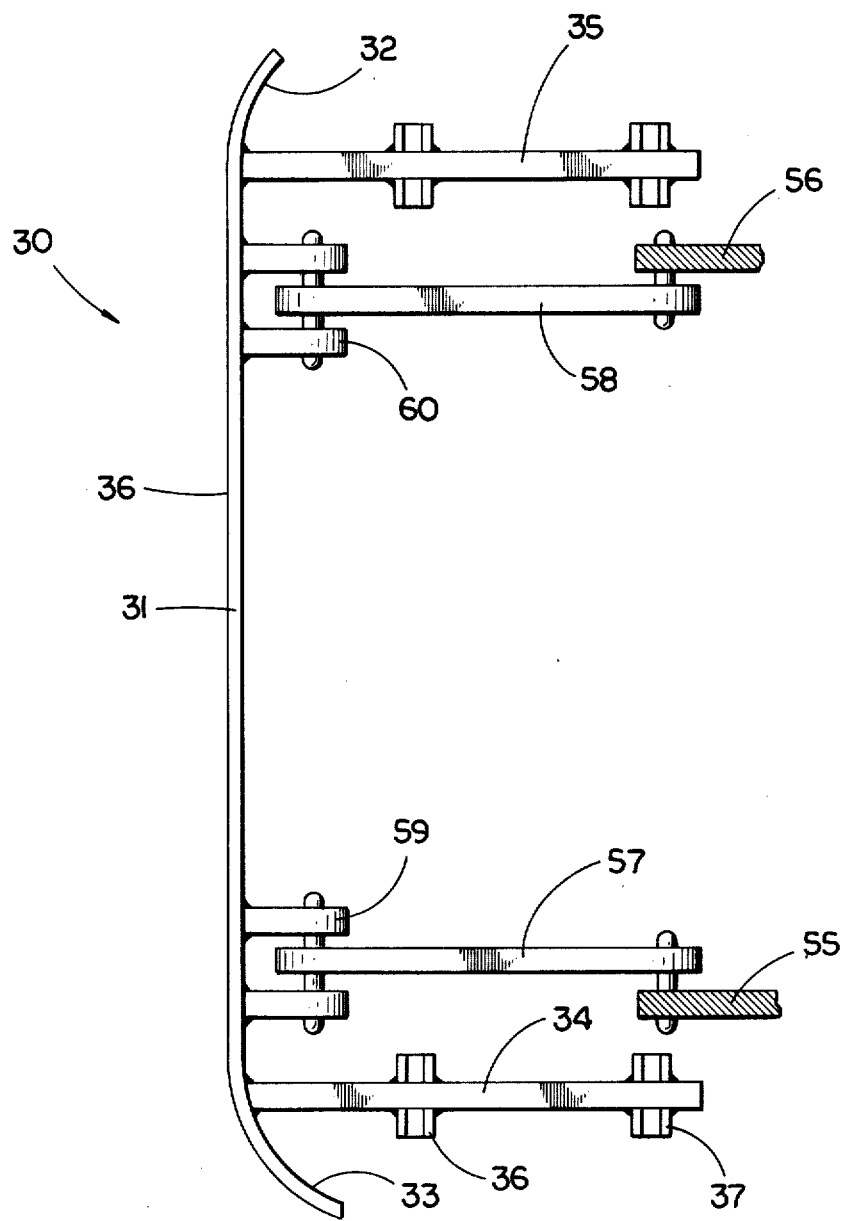
FIG. 4 is an enlarged view of one of the pulsating arms looking in the direction of arrows 4—4 of FIG. 2.

Contact member 30 will now be described, it being understood that a similar description applies to contact member 29. Contact member 30 (FIG. 4) is of a one-piece welded construction with the main body of the member extending along a straight line during a substantial portion of its length forming a contact portion 31 for strikingly engaging the plant. The opposite ends 32 and 33 of the member are flared or radiused to guide the plant between members 29 and 30. A pair of brackets 34 and 35 are fixedly attached to member 30 and extend away from the plant-engaging surface 36. Each bracket 34 and 35 is pivotally suspended by a pair of links in turn pivotally mounted to frame 24. For example, bracket 34 (FIGS. 2 and 3) includes a pair of upwardly extending ears 36 and 37 fixedly attached thereto which in turn are pivotally connected to a pair of links 38 and 39 having their top ends 40 and 41 pivotally mounted to support 27. Likewise, bracket 35 (FIG. 4) is pivotally mounted to a pair of upwardly extending links having top ends pivotally mounted to support 27. Thus, member 30 may swing back and forth in a shallow arc and in a general horizontal direction. Likewise, member 29 is pivotally suspended by links 44 and 45 (FIG. 2) in conjunction with a pair of links positioned rearwardly of links 44 and 45, all having top ends 46 pivotally mounted to support 26 allowing member 29 to swing back and forth in a shallow arc and in a general horizontal direction.

Each member 29 and 30 is reciprocated by a separate crank arm and crankshaft combination in turn powered by a hydraulic motor. For example, hydraulic motor 47 (FIG. 3) is mounted to frame 24 having a rotatable output shaft 48 in turn extending through and engaged with a conventional sprocket 49 frictionally engaged by a continuous belt 50 extending downwardly and around a second sprocket 51 fixedly mounted to crankshaft 52 rotatably mounted at the bottom end of support 27. Crankshaft 52 is bearingly supported by a pair of bearings 53 and 54 (FIG. 3) mounted to the bottom end of support 27. Crankshaft 52 has a pair of crank arms 55 and 56 fixedly attached at the opposite end portions of the shaft with each crank arm attached to a separate link having outer ends pivotally secured to member 30. Links 57 and 58 (FIG. 5) have outer ends pivotally connected by pins to a pair of rearwardly extending ears 59 and 60 in turn fixedly attached to portion 31 of member 30. The inner ends of links 57 and 58 are respectively pivotally connected to crank arms 55 and 56 in turn fixedly mounted to shaft 52. Thus, rotation of shaft 52 caused by movement of belt 50 results in movement of crank arms 55 and 56 about the axis of rotation 59 of shaft 52 thereby causing links 57 and 58 to move along with member 30 in a reciprocative horizontal movement with a slight arc imparted to the movement by links 38, 39, 42 (and the fourth link not shown on bracket 35) limiting the movement of the member.

A second crankshaft 60 is rotatably mounted to the bottom end of support 26 (FIG. 2) and has a pair of crank arms identical to crank arms 55 and 56 which are connected by links identical to links 57 and 58 in turn attached to member 29 thereby causing a reciprocating horizontal movement of member 29 which is also imparted a slight arc by movement limitation provided by links 44 and 45. A sprocket 61 fixedly mounted to output shaft 48 (FIG. 3) frictionally engages a continuous belt 62 which extends across the top portion of frame 24 to a second power shaft 63 (FIG. 2) rotatably mounted and bearingly received by the top portion of frame 24 being positioned above support 26. Sprocket 64 is fixedly mounted to shaft 63 and frictionally engages a continuous belt 65 which extends downwardly around and frictionally engaging a sprocket provided on crankshaft 60 thereby causing shaft 60 to rotate in unison with shaft 52 and thereby providing for reciprocating motion of both members 29 and 30. Only a single link 67 is shown in FIG. 2 as connecting member 29 to the crank arm on shaft 60, it being understood that a second crank arm and link are provided in a manner identical as that described for member 30. Best results are obtained by using toothed gear belts engaging matching toothed sheaves in lieu of friction belts 50, 62 and 65 along with their associated sprockets.

Each contact member 29 and 30 weighs approximately 80 pounds and is reciprocated at approximately 450 cycles per minute. Member 30 moves in the same direction as member 29 with both members moving generally horizontally back and forth striking the opposite sides of the grape vine in cyclic fashion. It can therefore be appreciated that a considerable amount of vibratory force would normally be applied to head 17 as a result of the reciprocative movement of members 29 and 30. In order to minimize the vibration, a pair of counterweight shafts are provided, each having a counterweight thereon rotating in a direction opposite of shafts 60 and 52 with the counterweights positioned so as to neutralize the reciprocative force exerted on head 17 by members 29 and 30. For example, counterweight shaft 68 (FIG. 3) has a pair of opposite ends bearingly received and supported by conventional bearings 69 and 70 in turn fixedly mounted to support 27. Shaft 68 is not contacted by belt 50 but instead has a separate chain connection to shaft 52. A standard sprocket 71 is fixedly mounted to shaft 68 and is aligned with and between a second chain sprocket 72 fixedly mounted to shaft 52 and an idler sprocket 73 fixedly mounted to an idler shaft bearingly mounted to support 27. A continuous roller chain 75 (FIG. 2) is engaged with the teeth of sprockets 72, 71 and 73 in such a manner so as to cause shafts 52 and 68 to rotate in opposite directions. In the embodiment shown in FIG. 2, roller chain 75 extends downwardly from idler sprocket 73 without contacting sprocket 71 and frictionally engages and extends around sprocket 72 extending then upwardly to engage the rearward portion of sprocket 71. Thus, with chain 75 moving in the direction of arrow 76 (FIG. 2), shaft 52 will rotate in a clockwise direction as shown in FIG. 2 with shaft 68 rotating in a counterclockwise direction. Suitable structure is provided for adjusting idler sprocket 73 upward or downward to control the tension on roller chain 75.

A pair of counterweights 77 and 78 (FIG. 3) are mounted to sprocket 71 and off-center relative to the axis of rotation 79 of shaft 68. Further, additional counterweights 80 and 81 are mounted to plate 82 fixedly mounted to shaft 68 with weights 80 and 81 also being provided off-center to the axis of rotation 79. Further, a pair of balance weights 83 and 84 are fixedly mounted to disk 85 and 86, respectively, in turn fixedly mounted to shaft 52 with weights 83 and 84 being located off-center relative to axis of rotation 59. It will be noted in FIG. 3 that counterweights 77, 78, 80 and 81 are positioned at the top dead center relative to axis 79 whereas balance weights 83 and 84 are simultaneously mounted at the bottom dead center relative to axis 59 and with the crank arm pivotal connection to links 57 and 58 being provided at the top dead center of shaft 52 relative to axis of rotation 59.

An identical counterweight shaft with weights is provided for member 29. Counterweight shaft 90 (FIG. 2) is bearingly mounted and rotatable on support 26 and carries a sprocket 91 in turn engaged by a continuous roller chain also engaged with a sprocket provided on crankshaft 60 and an idler sprocket located above sprocket 91 and identical to idler sprocket 73. Thus, counterweight shaft 90 rotates in a direction opposite of shaft 60 and carries a plurality of weights identical to weights 77, 78, 80 and 81. Likewise, shaft 60 carries a plurality of counterbalance weights identical to weights 83 and 84 with shafts 52 and 60 rotating in the same clockwise direction (as viewed in FIG. 2) whereas shafts 68 and 90 rotate in a counterclockwise direction. A clearer understanding of the operation of the reciprocating members with associated counterweight shafts will be obtained by referring to FIGS. 5-8.

In FIG. 5, contact members 29 and 30 are shown moving to the extreme right position. Crankshafts 60 and 52 rotate in a clockwise direction whereas shafts 90 and 68 rotate in a counterclockwise direction. Plant 100 which represents the grape vine is engaged by member 29 and is being forced to the right as shown in FIG. 6. The proximal ends of links 67 and 57 pivotally attached respectively to members 29 and 30 are pivotally connected to crank arms 66 and 55 fixedly mounted to crankshaft 60 and 52 with the pivotal connection between the crank arms and links being positioned at top dead center whereas the balance weights 83 mounted to shaft 52 are located at bottom dead center and the counterweights 78 mounted to shaft 68 are located at top dead center. Likewise, the weights mounted to shafts 60 and 90 are located respectively at bottom dead center and top dead center. Thus, with members 29 and 30 moving toward the right direction, a neutralizing force from the weights associated with shafts 68, 90, 60 and 52 is directed in a leftward position. That is, forces 101 and 102 exhibited by weights 83 and 78 are directed to the left with forces 103 and 104 being provided by the weights mounted to shafts 60 and 90.

In FIG. 6, members 29 and 30 are positioned in the extreme right position with plant 100 also being forced to the most extreme right position. In the position shown in FIG. 6, members 29 and 30 are moving neither to the left nor the right whereas the weights on shafts 90 and 68 are moving downward whereas weights on shafts 60 and 52 are moving upward. The downward forces 107 resulting from the downward moving weights neutralize the upward directed forces 108 resulting from the upward moving weights. Continued counterclockwise rotation of shafts 90 and 68 with clockwise rotation of shafts 60 and 52 result in members 29 and 30 moving back toward the left as shown in FIG. 7 with member 30 now contacting plant 100 and forcing the plant to the left. All weights on shafts 50, 60, 68 and 90 shown in FIG. 7 now produce an additive force to the right neutralizing the leftward directed force resulting from the movement of members 29 and 30 to the left. Continued rotation of the shafts results in the ultimate positioning of members 29 and 30 in the most leftward position with members 29 and 30 being temporarily at rest and with the top weights on shafts 68 and 90 providing an upward directed force which is neutralized by the downward directed force resulting from the downwardly moving weights on shafts 52 and 60.

Members 29 and 30 provide a pair of pulsating arms with mutually facing but opposed distal ends which are spaced apart a constant distance throughout the reciprocative movement of the members. The pivotal connection of head 17 to the harvester frame allows the head to track the row of vines whereas the suspension links including links 38, 39, 42, 44 and 45 holding members 29 and 30 allow the members 29 and 30 to be reciprocated back and forth against the plant or vine.

Members 29 and 30 are reciprocated by a driving means mounted on the frame which includes hydraulic motor 47, belts 50 and 62 along with crankshafts 52 and 60 and the associated crank arm linkage connected to members 29 and 30. The driving means is operatively associated with the members to reciprocate the members back and forth against the grape vine while limiting or insuring that each arm moves in the same general horizontal direction of movement. The slight arc of movement resulting from the suspension links is not critical to the operation of the picking head, it being understood that a general horizontal movement is desired with the arc resulting from the manner of mounting of the members. The suspension inks allow for a swinging arc movement of the attached members 29 and 30 in response to the motion imparted by the driving means. Members 29 and 30 move in unison; that is, member 29 is always moving in the same general horizontal direction as member 30. Each member 29 and 30 is a plant contactor which may be used to repetitively strike the plant to be harvested.

The counterweights mounted to shafts 68 and 90 provide a counterweight means which is operable to provide a force in a direction opposite of the direction of movement of members 29 and 30. The counterweights mounted to shafts 68 and 90 are located off-center with respect to the axis of rotation of the shafts.

The roller chains engaged with the sprockets on shafts 68 and 90 as well as the sprockets on shafts 52 and 60 and the two idler sprockets provide a timing means which is operatively associated with the off-centered counterweights provided on shafts 68 and 90 along with crankshafts 52 and 60 to rotate each counterweight on shafts 68 and 90 when each crankshaft 52 and 60 rotate. Further, the timing means or roller chains are operably associated with contact members 29 and 30 along with the counterweights on shafts 68 and 90 so as to move the counterweights in response to the reciprocative movement of the contact member while at the same time limiting movement of the counterweights to a direction other than the direction of reciprocative movement of contact members 29 and 30. The timing means also is operable to transmit rotational force from the crankshafts 52 and 60 to shafts 68 and 90.

The vibration normally resulting from the reciprocating contact members is dampened by means mounted to the head which includes the plurality of weights mounted to shafts 68 and 90 which are operatively associated with members 29 and 30 so as to move oppositely of members 29 and 30. The counterbalance shafts are connected by means of the roller chains which are engaged with the pair of crankshafts in turn driving members 29 and 30. The weights located on shaft 68 are angularly located relative to axis 79, the same as the angular location of the weights provided on shaft 90. Further, the balance weights 83 and 84 are angularly located on shaft 52 the same as the angular location of the balance weights provided on shaft 60. The balance weights on shafts 52 and 60 are angularly positioned opposite of the connection of the proximal ends of the connecting links of elements 29 and 30 with respect to the crankshafts. For example, balance weights 83 and 84 are angularly located 180 degrees from the pivotal connection of links 57 and 58 to shaft 52. Each link 57 and 58 has a proximal end which is bearingly connected off-center relative to the axis of rotation 59 of shaft 52 so as to cause a reciprocating movement to member 30.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A harvester comprising:

frame means operable to move along in straddling fashion a row of plants having growing items thereon and including a receptacle to catch said items falling from said plants;

a head pivotally mounted on said frame means to pulsate said plants to cause items growing thereon to fall therefrom into said receptacle, said head including:

a frame pivotally mounted to said frame means and having a pair of downwardly extending spaced apart supports forming a channel through which said row of plants may pass;

a pair of horizontally movable arms mountable to said supports with spaced apart distal ends positionable on opposite sides of said row of plants;

driving means mounted on said frame and operatively associated with said arms to reciprocate said arms back and forth against said plants while limiting movement of one arm to approximately the same horizontal direction of movement as the other arm, said driving means including a first and second crank shaft rotatably mounted on said frame, a source of energy having a rotatable output operatively driving said first and second crank shafts which are connected to said arms maintaining a constant spacing between said distal ends as said arms are reciprocated by said driving means, each arm including at least a pair of links with top ends pivotally mounted to said frame and bottom ends pivotally connected to the attached arm suspending the attached arm therefrom and allowing a swinging arc movement of said attached arm in response to said driving means and independent of pivotal movement of said frame, said distal ends being rigid elongated members extending in the direction of said row of plants;

counterweight means including a first and a second off centered counterweight respectively on said first and second crank shaft rotatably mounted on said frame, said counterweight means being operable to provide a vibration neutralizing force in a direction opposite of the direction of movement of said arms; and timing means operatively associated with said first and second off centered counterweights along with said first and second crank shafts being operable to rotate each counterweight when each crank shaft rotates, said timing means including first and second shafts rotatably mounted on said frame and operably driven with said first and second crank shaft but isolated from said arms providing dampening of vibration imparted to said frame to said arms.

2. The harvester of claim 1 wherein each arm includes one of said rigid elongated members fixedly attached to a pair of brackets in a one piece construction, each elongated member extending along a straight line during a substantial portion of its length with opposite flared ends to guide said plants, each of said brackets pivotally connected and suspended to said bottom ends of said links, each arm including an intermediate link with opposite ends pivotally connected to and between one elongated member and one of said crank shaft.

* * * * *